(12) United States Patent
Agrawal et al.

(10) Patent No.: US 10,094,546 B2
(45) Date of Patent: Oct. 9, 2018

(54) CONFIGURABLE STREETLIGHT SENSOR PLATFORM

(71) Applicant: CIMCON Lighting, Inc., Billerica, MA (US)

(72) Inventors: Anil Agrawal, Westford, MA (US); Terrance Riedel, Hingham, MA (US)

(73) Assignee: CIMCON Lighting, Inc., Billerica, MA (US)

( * ) Notice: Subject to any disclaimer, the term of this patent is extended or adjusted under 35 U.S.C. 154(b) by 0 days.

(21) Appl. No.: 15/446,861

(22) Filed: Mar. 1, 2017

(65) Prior Publication Data

US 2017/0336061 A1 Nov. 23, 2017

Related U.S. Application Data

(60) Provisional application No. 62/338,769, filed on May 19, 2016.

(51) Int. Cl.
*F21V 3/04* (2018.01)
*F21V 23/04* (2006.01)
(Continued)

(52) U.S. Cl.
CPC ........ *F21V 23/0442* (2013.01); *B64C 39/024* (2013.01); *B64F 1/00* (2013.01); *F21V 23/045* (2013.01); *G01D 11/245* (2013.01); *H02J 7/0045* (2013.01); *H02M 7/02* (2013.01); *B64C 2201/042* (2013.01); *F21S 8/085* (2013.01); *F21W 2131/103* (2013.01);
(Continued)

(58) Field of Classification Search
CPC .................. G01D 11/24; F21W 2131/103
See application file for complete search history.

(56) References Cited

U.S. PATENT DOCUMENTS

| | | | | |
|---|---|---|---|---|
| 4,731,551 A | * | 3/1988 | Gibbs | H05B 37/0281 250/214 AL |
| 7,723,862 B1 | * | 5/2010 | Spillman | H05B 37/00 307/11 |

(Continued)

FOREIGN PATENT DOCUMENTS

| | | |
|---|---|---|
| KR | 10-2010-0009556 | 1/2010 |
| WO | 2013/026008 | 2/2013 |

OTHER PUBLICATIONS

Sensity NetSense Core Node EX, Externally mounted NEMA Connector, WWW.sensity.com, no date provided on document.*

(Continued)

*Primary Examiner* — Fritz Fleming
(74) *Attorney, Agent, or Firm* — Fish & Richardson P.C.

(57) ABSTRACT

The technology described in this document is embodied in a sensor platform that includes an enclosure for housing one or more sensors, the enclosure configured to be deployed between a streetlight and a streetlight controller that manages operations of the streetlight. The sensor platform also includes an electrical receptacle for receiving the streetlight controller in a substantially secure configuration. The sensor platform also includes an electrical connector for connecting the enclosure to the streetlight. The sensor platform also includes at least one pass-through connector disposed within the enclosure to provide an electrical connection between the electrical connector and the electrical receptacle.

30 Claims, 7 Drawing Sheets

(51) Int. Cl.
  *H02M 7/02* (2006.01)
  *H02J 7/00* (2006.01)
  *G01D 11/24* (2006.01)
  *B64C 39/02* (2006.01)
  *B64F 1/00* (2006.01)
  *F21S 8/08* (2006.01)
  *F21W 131/103* (2006.01)
  *H05B 37/02* (2006.01)
  *H02J 3/38* (2006.01)

(52) U.S. Cl.
  CPC ........... *H02J 3/383* (2013.01); *H05B 37/0218* (2013.01); *H05B 37/0227* (2013.01)

(56) References Cited

U.S. PATENT DOCUMENTS

| | | | |
|---|---|---|---|
| 7,828,463 B1 | 11/2010 | Willis | |
| 9,226,368 B2* | 12/2015 | Agrawal | H05B 37/03 |
| 9,387,928 B1* | 7/2016 | Gentry | B64C 39/024 |
| 9,546,776 B2* | 1/2017 | Kuti | |
| 9,651,420 B2* | 5/2017 | Weber | G01J 1/0448 |
| 9,927,108 B2* | 3/2018 | Kuti | F21V 23/0471 |
| 2007/0013513 A1* | 1/2007 | Tang | G08B 13/19634 |
| | | | 340/541 |
| 2008/0175216 A1* | 7/2008 | Nasco | F21S 8/081 |
| | | | 370/338 |
| 2011/0062888 A1* | 3/2011 | Bondy | H05B 33/0815 |
| | | | 315/294 |
| 2012/0074641 A1 | 3/2012 | Murata | |
| 2013/0015707 A1 | 1/2013 | Redmann | |
| 2013/0040471 A1* | 2/2013 | Gervais | F21V 23/0464 |
| | | | 439/56 |
| 2013/0064136 A1* | 3/2013 | Apostolakis | H04W 88/16 |
| | | | 370/254 |
| 2013/0181636 A1 | 7/2013 | Agrawal | |
| 2015/0115802 A1* | 4/2015 | Kuti | F21V 15/01 |
| | | | 315/149 |
| 2015/0124100 A1* | 5/2015 | McRory | H04N 7/185 |
| | | | 348/151 |
| 2015/0173159 A1* | 6/2015 | Lin | G01W 1/00 |
| | | | 315/120 |
| 2017/0138579 A1* | 5/2017 | Kuti | F21V 23/0471 |

OTHER PUBLICATIONS

International Search Report and Written Opinion from PCT application PCT/US2017/020238 dated Aug. 24, 2017. (7 pages).

* cited by examiner

CONFIGURABLE STREETLIGHT SENSOR PLATFORM

PRIORITY CLAIM

This application claims priority to U.S. Provisional Application 62/338,769, filed on May 19, 2016, the entire content of which is incorporated herein by reference.

TECHNICAL FIELD

This disclosure generally relates to a configurable platform for sensors located on streetlights.

BACKGROUND

Many cities and towns have thousands of streetlights to keep streets and walkways lit at night. A given streetlight may be turned on or off using a photocell deployed on the streetlight.

SUMMARY

In one aspect, this document features a sensor platform that includes an enclosure for housing one or more sensors, the enclosure configured to be deployed between a streetlight and a streetlight controller that manages operations of the streetlight. The sensor platform also includes an electrical receptacle for receiving the streetlight controller in a substantially secure configuration, and an electrical connector for connecting the enclosure to the streetlight. The sensor platform also includes at least one pass-through connector disposed within the enclosure to provide an electrical connection between the electrical connector and the electrical receptacle.

In another aspect, this document features an apparatus that includes a streetlight controller that manages operations of a streetlight, and a sensor platform. The sensor platform includes an enclosure for housing one or more sensors, the enclosure configured to be deployed on the streetlight, an electrical receptacle for receiving the streetlight controller in a substantially secure configuration, an electrical plug for connecting the enclosure to the streetlight, and one or more pass-through connectors disposed within the enclosure to provide an electrical connection between the electrical plug and the electrical receptacle.

In another aspect, this document features a streetlight that includes a streetlight housing including a lamp, a streetlight controller that manages one or more operations of the streetlight, and a sensor platform disposed between the streetlight controller and the streetlight housing. The sensor platform includes one or more sensors, an electrical receptacle for receiving the streetlight controller in a substantially secure configuration, an electrical plug for connecting the sensor platform to the streetlight housing, and one or more pass-through connectors disposed between the electrical plug and the electrical receptacle for providing an electrical connection between the streetlight housing and the streetlight controller.

Implementations of the above aspects can include one or more of the following.

The one or more sensors can include at least one of an environmental sensor, a noise sensor, a seismic sensor, a threat sensor, a contact sensor, and a motion sensor, a parking sensor, a pedestrian counter, and a traffic counter. At least a subset of the one or more sensors can be a part of a wireless sensor network. The wireless sensor network can include one or more external sensors disposed outside the enclosure of the sensor platform.

The sensor platform can also include a circuit board disposed within the enclosure, wherein the circuit board includes a plurality of slots configured to receive at least a subset of the one or more sensors. At least some slots in the plurality of slots can be electrically connected to the pass-through connector. At least some slots in the plurality of slots can be electrically connected to an input/output line of one or more processors, for example, to sample, process, store, and communicate the data being sensed by the one or more sensors. One or more of the slots can be connected to the pass-through connector through an alternating current (AC) to direct current (DC) converter. One or more of the slots can include an input/output port electrically connected to an input/output line of one or more processors. The electrical receptacle of the sensor platform can comply with a standard associated with streetlight fixtures. The standard can be set by National Electrical Manufacturers Association (NEMA). Power for the one or more sensors can be provided through the pass-through connector. The sensor platform can include an outlet configured to provide power to an external sensor or device, wherein the outlet is connected to the at least one pass through connector.

In some implementations, the technology described herein may have one or more of the following advantages. A configurable sensor platform (which may be co-located with a streetlight controller) on a streetlight may allow for multiple sensors to be implemented on the streetlight while taking advantage of existing communications connections and power sources. Such a configurable sensor platform may also increase capability for monitoring and reporting conditions on or around the streetlight. For example, the sensor platform can be configured to include sensors for monitoring a threat (e.g. a biohazard, or a gunshot), an environmental condition (e.g. carbon monoxide levels), weather, or traffic conditions. In some implementations, the sensor platform can be configured to detect the presence of wireless devices near the streetlight, such that location-specific information may be delivered to the wireless devices.

In some cases, the sensor platform may be customized with different types of sensors. This customizability may allow developers or users to design or select sensors for inclusion in the configurable sensor platform, based on their particular requirements. The configurable sensor platform may be configured to be moved from one streetlight to another as needed. Such portability may be useful, for example, to move a set of sensor platforms to a particular area of interest in a city or in an area surrounding a special event.

In some cases, the configurable sensor platform may also allow for improved streetlight control by providing one or more inputs to a streetlight controller. Such inputs may be used by the streetlight controller in deciding, for example, a mode of operation for the streetlight. For example, the inputs can be used by the controller to determine whether to switch the streetlight on or off, or to operate the streetlight at a predetermined level of dimness. For example, streetlights can be set to a predetermined level of dimness in one mode of operation to save energy. If a sensor disposed in the sensor platform detects motion near the streetlight, the platform may provide the information to a streetlight controller such that the streetlight controller turns the streetlight on to full power for a predetermined amount of time.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1:
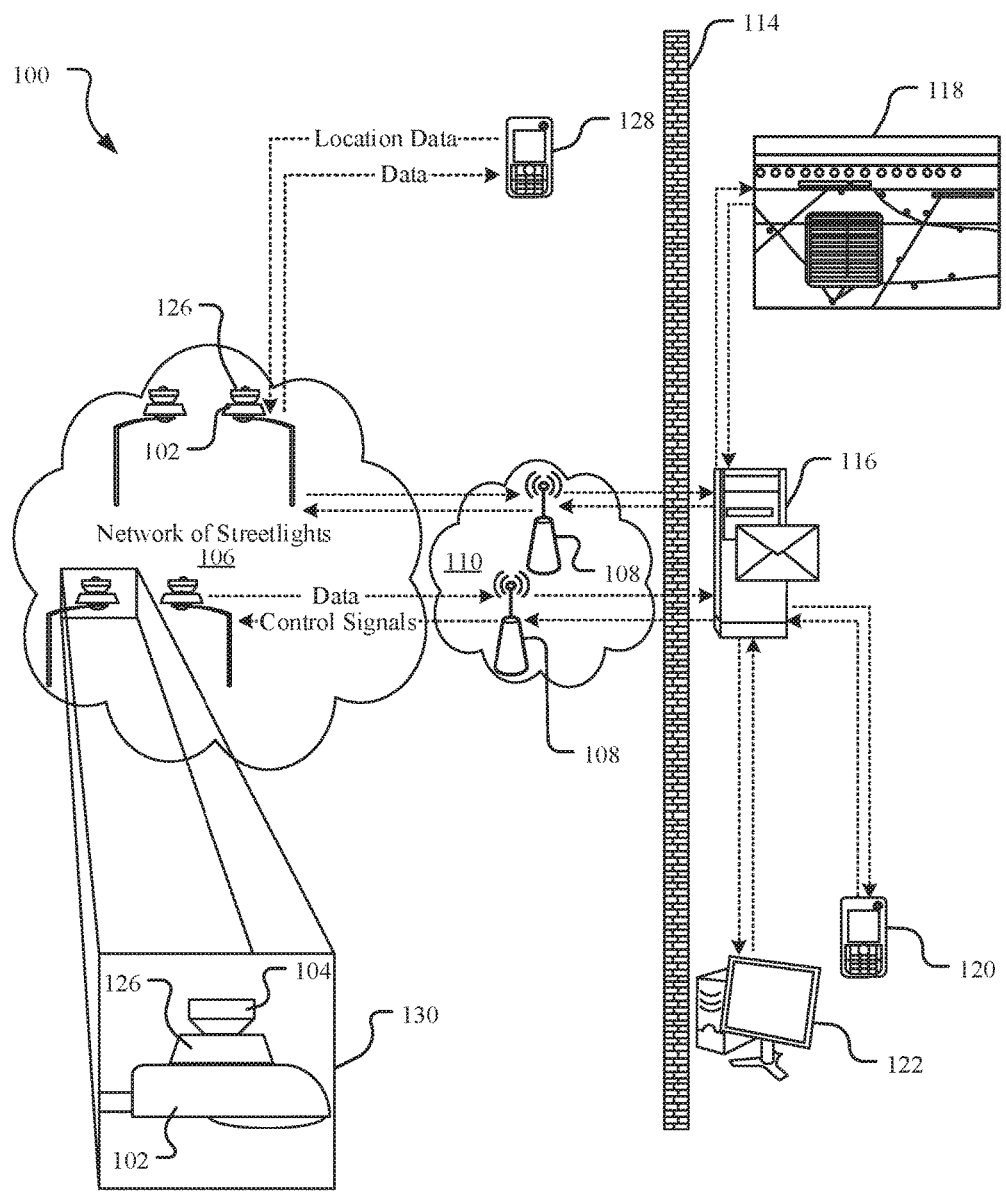
FIG. 1 shows an example of a streetlight management system.

Streetlight controllers disposed on streetlights may be used for controlling the streetlights in various ways. In some implementations, the streetlight controllers can be programmed to turn on, turn off, or dim the streetlight, for example, at scheduled times, or based on a set of conditions. The streetlight controllers can also be used in conjunction with photocells, for example, to make lighting decisions based on ambient weather conditions. Streetlight controllers may include one or more sensors that can be used to make decisions regarding the operational mode of the corresponding streetlights. For example, a streetlight controller can include a light sensor such as a photocell to determine whether the ambience is dark enough to warrant switching the streetlight on. In fact, due to the location and ubiquity of streetlights, in some cases, it may be advantageous to dispose various types of sensors on the streetlights. Disposing such sensors on streetlights may provide specific advantages. For example, disposing a traffic counter on a streetlight could allow a city to gather and analyze traffic data to determine, for example, how to efficiently allocate funding for road repairs. In another example, disposing an environmental sensor, like a pollutant sensor, on a streetlight could allow for monitoring pollution, including, for example, a level of carbon dioxide or carbon monoxide, a concentration of particles in the air, etc. In another example, disposing a motion sensor on a streetlight could increase energy efficiency by allowing the streetlight to be turned on upon sensing motion and turned off or dimmed after a set period of time in the absence of motion. In general, the sensors that are deployed on a streetlight may be selected based on various requirements that may depend on, for example, events, location, time, and/or availability of new sensors.

Sensors can be deployed on streetlights in various ways. For example, the sensors may be directly incorporated into a streetlight controller. However, this would require custom-made streetlight controllers for various combinations of sensors. In addition, an existing controller may have to be replaced if a new sensor is desired to be deployed, which in turn may be inefficient and expensive. The sensors could alternatively be independently deployed on the streetlight. However, such independent deployment may require new connections, which may vary from one sensor to another.

The technology described in this document provides a configurable sensor platform that allows for deployment of one or more sensors on the streetlight while utilizing connections available on a streetlight. The configurable sensor platform may include a sensor module, which may be customized to include the user's desired sensors. For example, the sensor module can include multiple sensor receptacles configured to receive various combinations of desired sensors. In some implementations, the configurable sensor platform is customized such that the sensor platform may be connected to a standard receptacle on a streetlight. Thus, the sensor platform may facilitate use of power from the streetlight as a power source for the sensors. The streetlight power can be used, for example, as a primary power source, a secondary or back-up power source, or a power source for charging a storage device such as a battery that in turn powers one or more sensors on the sensor platform. In some implementations, the configurable sensor platform may include a landing area configured to facilitate operations of unmanned aerial vehicles (UAVs) such as drones. For example, such a landing area can be configured to allow UAVs to take-off, land, or park on the sensor platform. In some implementations, the sensor platform can include one or more sensors for monitoring/metering activities of the UAVs using the landing area, and/or a power outlet for charging the UAVs parked on the landing area. For example, in some implementations, a sensor platform may include a charging port configured to allow an UAV to connect to a power source. The power supply to the streetlight could be used as the power source for the charging of the UAV.

Referring to FIG. 1, an example of a streetlight system 100 can include multiple streetlights 102 which may be electrically connected with sensor platforms 126 and/or streetlight controllers 104. The sensor platform 126 can be configured to communicate with other sensor platforms deployed on streetlights 102 within a network 106. Network 106 can include a network of streetlight controllers 104 and/or a network of sensor platforms 126. In some implementations, the sensors on the sensor platform 126 can communicate via transceivers on the streetlight controller 104.

In some implementations, the network 106 can be configured to communicate with a remote server 116, for example, over a communication network 110. In some implementations, the network 110 can communicate with the server 116 via one or more gateways or access points 108. In some implementations, the network 110 can communicate with the server 116 directly. In some implementations, the server 116 can include an industrial control system. In some implementations, the server 116 can be a supervisory control and data acquisition (SCADA) server. In some implementations, the server can be a central management server. In some implementations, the server 116 can be a server farm that includes multiple servers.

The network 110 can include one or more gateways 108. The gateways 108 can be data coordinator units that act as a link between the streetlight controllers 104 and sensor platforms 126 and the server 116. A gateway 108 can be configured to communicate with multiple streetlight controllers 104 and/or sensor platforms 126. For example, a gateway 108 can be configured to support up to 1000 streetlight controllers 104 and/or sensor platforms 126. In some implementations, the gateway 108 can communicate with other gateways 108 through a wired or wireless connection. In some implementations, the gateways 108 can communicate with the server 116 through a wired connection (e.g., Ethernet). In some implementations, the gateways 108 can wirelessly communicate with the server 116. In some implementations, gateways 108 can use Global System for Mobile Communications (GSM) or General Packet Radio Service (GPRS) to wirelessly communicate with the server 116. A firewall 114 can separate the gateways 108 and the server 116 to keep the server 116 secure.

The gateway 108 can be a computing device mounted on an existing structure such as a streetlight, electric pole, or building. The gateway 108 can include, for example, one or more of a processor, a real-time clock, a transceiver, a memory, an Ethernet port, a USB port, and a serial port. The gateway 108 can connect to a computing device such as the server 116 using one of its ports. The gateway 108 can have an enclosure for wall mounting or an enclosure for pole mounting. The enclosure can be made from polycarbonate.

In some implementations, the network 110 and the server 116 can be separated by a security layer such as a firewall 114. In some implementations, the network 110 can include a computing device (e.g. a media convergence server (MCS)) that receives information from various gateways 108 and communicates with the server 116, for example, using an Ethernet connection. Such a computing device can also be configured to relay information received from the server 116 to the gateways 108. In some implementations, the gateways 108 can be configured to communicate directly with the server 116.

In some implementations, the server 116 can be configured to communicate with various computing devices related to managing the streetlights 102. One or more of these devices can be configured to execute an application that facilitates individual or grouped management of the streetlights 102. For example, the server 116 can be configured to communicate with field staff using, for example, mobile devices 120 and office staff through computing devices 122. In some implementations, the server 116 can communicate with one or more computing devices that execute a streetlight management software. In some implementations, the server 116 executes the streetlight management software and provides user-interfaces on one or more of the mobile device 120 and the computing device 122.

In some implementations, the sensor platform 126 can be configured to interface with a streetlight controller 104 deployed on a streetlight 102. For example, the sensor platform 126 may be deployed between a streetlight 102 and a streetlight controller 104 such that the sensor platform 126 is powered from connections available on the streetlight 102, and maintains a functional connection between the streetlight 102 and the streetlight controller 104. In some implementations, the sensor platform 126 may also be configured to maintain a functional connection between a streetlight 102 and a photocell associated with the streetlight 102. This functional connection may be maintained such that power from the streetlight is passed through the sensor platform 126 to the associated streetlight controller 104 or photocell.

In some implementations, the sensor platform 126 can be mounted on a streetlight. The sensor platform 126 can be placed within an enclosure that is mounted on a streetlight 102. The enclosure can have an electrical connector 206 (e.g. a two, three, or four pronged plug, or a multi-pin connector such as a five or seven-pin connector) that can be connected to an electrical receptacle on a streetlight 102. This is illustrated in the examples of FIG. 2B and FIG. 2C, which show the connections on a sensor platform 126 that allow the sensor platform 126 to electrically interface with a streetlight 102, a streetlight controller 104, or a photocell.

Figure 2A:
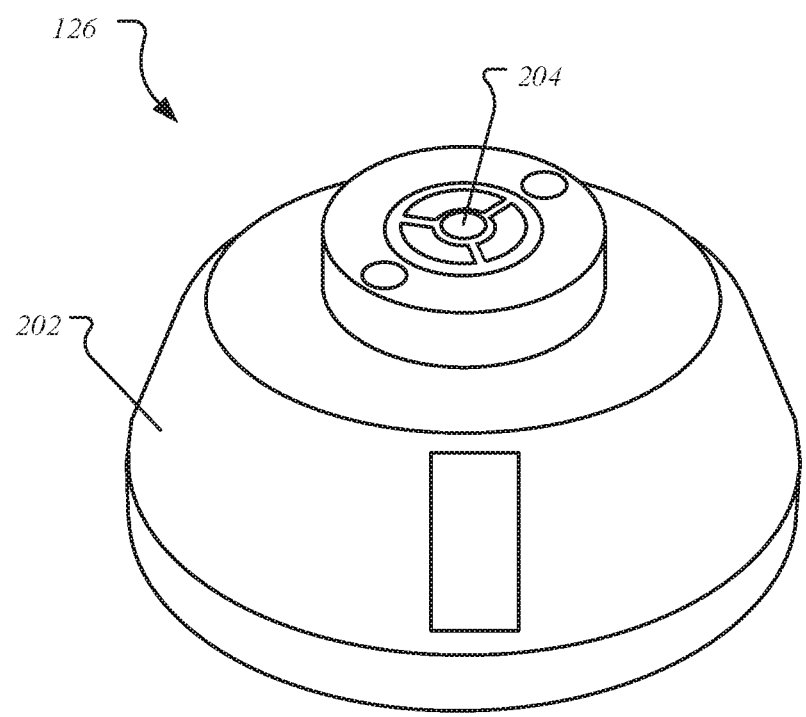
FIG. 2A is a top view of an example of a sensor platform housing.

Referring to FIG. 2A, a sensor platform 126 includes an enclosure 202 and an electrical receptacle 204. In some implementations, the sensor platform 126 can receive an electrical connector of a streetlight controller 104 or a photocell via the electrical receptacle 204. The electrical connector and the corresponding receptacle can be in accordance with the standards used in the country in which the streetlight is deployed. For example, in the United States, the electrical connector and the corresponding receptacle can be in accordance with standards set by National Electrical Manufacturers Association (NEMA). This electrical connection between the electrical receptacle 204 of the sensor platform 126 and an electrical connector of a streetlight controller 104 or a photocell allows power to be relayed from a streetlight 102 through the sensor platform 126 via a pass through connector (shown in FIG. 3A) to the streetlight controller 104 or photocell.

Figure 2B:
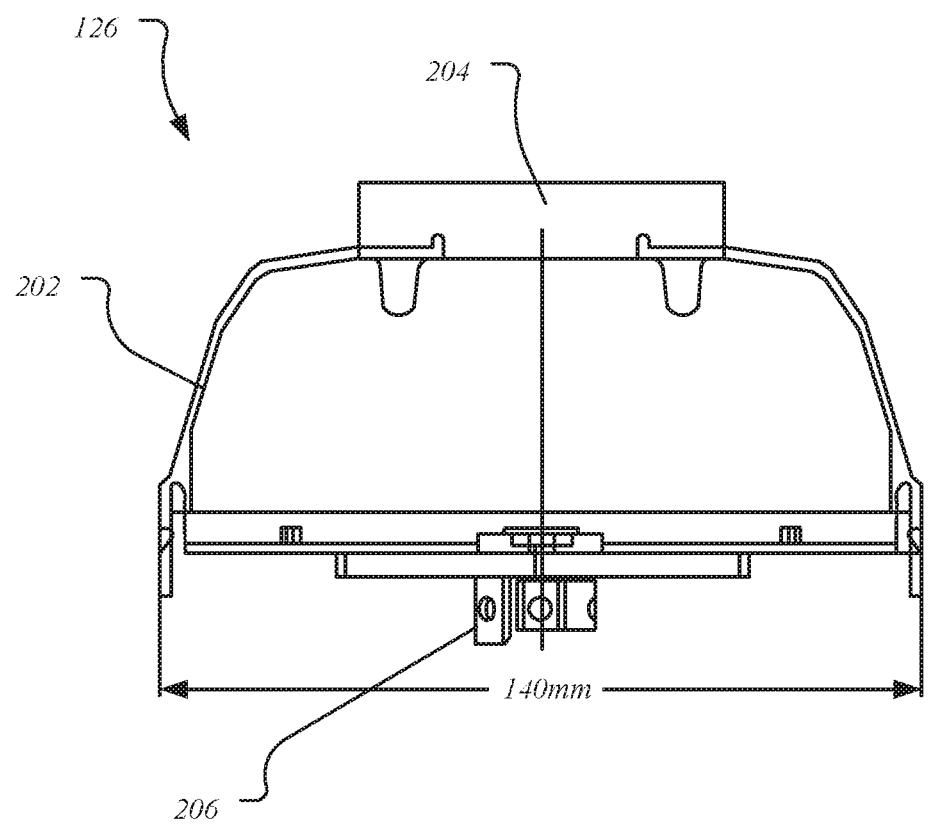
FIG. 2B is a side view of the sensor platform housing of FIG. 2A.
Figure 2C:
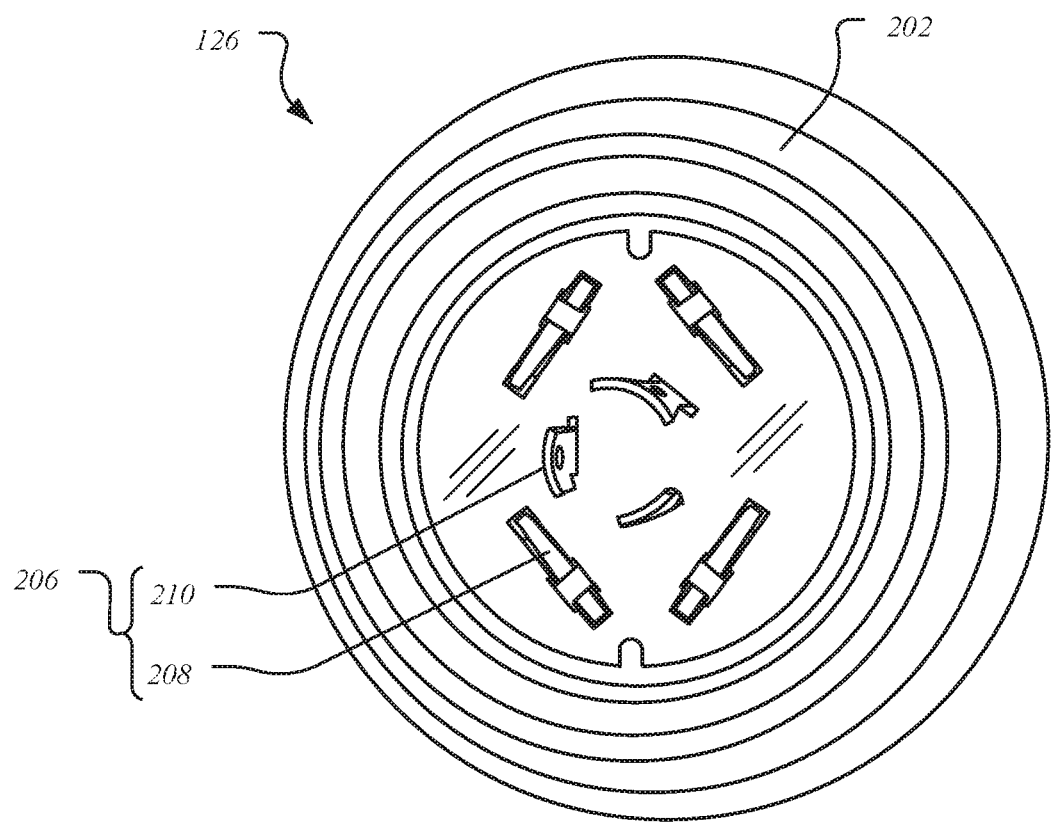
FIG. 2C is a bottom view of the sensor platform housing of FIG. 2A.

Referring to FIG. 2B, the sensor platform 126 can have an electrical connector 206 that can be connected to an electrical receptacle on a streetlight 102 (see FIG. 1). The electrical connector 206 and the corresponding receptacle on the streetlight 102 can be in accordance with the standards used in the country in which the streetlight is deployed. In some implementations, the electrical connector 206 can be a twist-locking plug. The electrical connector 206 and the corresponding receptacle can be in accordance with the standards used in the country in which the streetlight is deployed. For example, in the United States, the electrical connector and the corresponding receptacle can be in accordance with standards set by National Electrical Manufacturers Association (NEMA).

In some implementations, the enclosure 202 can be attached to the streetlight housing using other forms of connectors such as a threaded connector that can be twisted or screwed into an appropriately threaded receptacle disposed on the streetlight. The threaded receptacle capable of receiving the threaded connector of the enclosure 202 can be, for example, an integral part of the streetlight housing, or affixed to the streetlight housing. The sensor platform 126 can therefore be electrically connected to a power source on the streetlight 102 via a connection disposed on the streetlight. Therefore, the technology described herein provides a configurable sensor platform 126 that is capable of receiving various sensors, and reduces or potentially obviates the need for additional wiring by using existing connections on the streetlight. The streetlight 102 may provide AC or DC power to the electrical connector 206. In some implementations, the sensor platform 126 can be attached to the streetlight housing using a threaded connector that can be twisted or screwed into an appropriately threaded receptacle disposed on the streetlight 102. The threaded receptacle capable of receiving the threaded connector of the streetlight controller housing can be, for example, an integral part of the streetlight housing, or affixed to the streetlight housing.

In some implementations, the sensor platform 126 may be used with a streetlight controller 104 or a photocell (not shown). The sensor platform 126 can have an electrical receptacle 204 for receiving an electrical connector of a streetlight controller 104 or a photocell, as discussed in the description of FIG. 2A. In some implementations, the connector and the corresponding receptacle can be in accordance with the standards used in the country in which the streetlight is deployed. For example, in the United States, the connector can be a twist-locking plug in accordance with standards set by NEMA.

Referring to FIG. 2C, the sensor platform 126 may have an electrical connector 206. In the depicted embodiment, the electrical connector 206 is a NEMA 7-pin connector (compatible with an ANSI C136.41 Dimming Receptacle). Three central pins 210 may be used to relay power for powering both the sensor platform 126 and an associated streetlight controller 104 or photocell. Two of the outside pins 208, may be used for dimming the streetlight. The remaining outside pins 208 can be available to capture and communicate additional sensor data. This additional sensor data may originate from sensors included in the sensor platform 126, or from sensors included in a streetlight controller 104. The central pins 210 and outside pins 208 shown in this embodiment make up an electrical connector 206 that is a standard NEMA ANSI C136.41 Dimming Receptacle 7-pin connector.

The sensor platform 126 can be mounted on a streetlight 102 in various configurations. In some implementations, a streetlight controller 104 can be mounted on a sensor platform 126, which in turn can be mounted on a streetlight 102 as shown in the inset 130 of FIG. 1. In some implementations, the sensor platform may be mounted on a streetlight controller. In some implementations, the sensor platform may be integrated within the streetlight controller. In some implementations where the sensor platform is integrated within the streetlight controller, the sensor platform is integrated in a removable configuration. In some implementations where the sensor platform is mounted on a streetlight controller, the sensor platform may include a solar cell configured to power one or more sensors of the sensor platform. The streetlight controller housing can have an electrical connector 206 (e.g. a two, three, or four-pronged plug, or a multi-pin connector such as a five or seven-pin connector) that can be connected to an electrical receptacle 204 on a sensor platform 126. In some implementations, the sensor platform 126 includes a pass-through connector that is coupled between an electrical connector 206 (such as a connector compatible with an ANSI C136.41 Dimming Receptacle) and an electrical receptacle 204 (such as a NEMA ANSI C136.41 Dimming Receptacle). This is described below in additional detail with reference to FIG. 3A. The pass through connector allows power to be pulled from the streetlight 102, through the sensor platform 126, and delivered to the streetlight controller 104. In this way, the additional sensors can be deployed without disrupting functional connectivity between the streetlight 102 and streetlight controller 104.

In some implementations, the sensor platform 126 may be configured to receive a photocell via a corresponding electrical receptacle 204. In some implementations, the photocell can be mounted as a part of a housing of the streetlight controller 104. In some implementations, the photocell can be a separate unit having a connector for connecting to a receptacle 204 on the sensor platform 126 or to a receptacle on the streetlight controller 104. The photocell can detect ambient light, and the streetlight controller 104 can receive light measurement data from the photocell. In some implementations, the light measurement data can be used to make lighting decisions or override an active lighting schedule (e.g., on/off/dim settings as per a pre-set schedule). In some implementations, the connector 206 and the corresponding receptacle can be in accordance with the standards used in the country in which the streetlight 102 is deployed. For example, in the United States, the connector 206 can be a twist-locking plug in accordance with standards set by NEMA.

A sensor platform 126 may be disposed on a streetlight 102 to incorporate various sensors into the network 106, which in turn may enhance the ability of the network 106 to gather information on conditions at or near the streetlight 102. The information gathered would depend on the particular sensors deployed in the sensor platform 126 and installed external to the sensor platform and may include, for example, pollution conditions, traffic conditions, pedestrian traffic information, safety conditions, or other environmental conditions. The sensors may be disposed, for example, in a sensor module of the configurable sensor platform 126. The individual sensors included in the sensor platform 126 may be selected by an authority or user in charge of the deployment. For example, the sensors on sensor platforms 126 to be deployed in a particular city may be selected by the corresponding municipality, based on the conditions desired to be monitored. The sensors that may be deployed in the sensor platform 126 can include, for example, environmental sensors, carbon monoxide sensors, carbon dioxide sensors, noise sensors, seismic sensors, threat sensors, radioactivity sensors, biochemical sensors, contact sensors, motion sensors, parking sensors, traffic counters, or pedestrian counters. Types of sensors that may be included in the sensor platform include, for example, acoustic sensors such as microphones, vibration sensors such as seismographs, automotive sensors, chemical sensors such as carbon monoxide or carbon dioxide detectors, electrical sensors such as ammeters and voltmeters, magnetic sensors, wireless sensors, flow sensors, fluid velocity sensors, sensors configured to measure position/speed/acceleration of passing vehicles, optical/imaging sensors such as cameras or number-plate readers, pressure sensors such as barometers, force sensors, density and/or level sensors, thermal sensors, proximity/presence sensors such as motion detectors, environmental sensors, wind-speed sensors, hygrometers, and radio frequency identification (RFID) detectors. In some implementations, one or more sensors may be deployed on the streetlight, but not on the sensor platform. In such cases, the sensors external to the sensor platform can be configured to communicate with the sensor platform over wired or wireless connections.

Different combinations of sensors may be deployed in a sensor platform 126 based on particular concerns in certain areas. For example, threat sensors, like biochemical sensors or radioactivity sensors, may be included in sensor platforms 126 to be deployed on streetlights 102 close to an airport, a stadium, or a large public gathering space. In such cases, the sensors could gather safety information to be relayed to police or other public safety officials. In another example, traffic sensors may be included in sensor platforms 126 to be deployed on streetlights 102 close to busy roads or high traffic areas. As other examples, motion sensors and parking sensors may be included in sensor platforms 126 to be deployed on streetlights 102 in parking lots, and noise sensors may be included in sensor platforms 126 to be deployed on streetlights 102 in residential areas. In some implementations, the sensor platform 126 may also be portable such that the sensor platform 126 can be removed from one streetlight 102 and installed on another as desired. This may be advantageous when data gathered from the sensors would be useful in a particular area of a city at a particular time, for example, for a special event. In one particular example, if a city of municipality owns a limited number of sensor platforms 126 (e.g., platforms including traffic and parking sensors), the platforms can be deployed on compatible streetlights at one location for a particular event, and then moved to compatible streetlights at a different location for another event. Because the sensor platforms 126 can be deployed with or without addition streetlight equipment (e.g., streetlight controller 104 or photocell), the portability is independent of whether or not the compatible streetlights include such equipment.

In some implementations, information gathered by the sensors of the sensor platform 126 may be sent to the streetlight controller 104 which then decides which mode to place the streetlight in, either on, off, or at a particular level of dimness. A configurable sensor platform may also allow for controlling other devices that may be located at or near the streetlight. For example, the sensor platform 126 can be configured to communicate with an external camera, and may direct the camera to point in a certain direction or to start or stop recording based on one or more control signals received from the sensor platform 126. Such a control signal can be generated based on the output of one or more sensors disposed on the sensor platform 126. Information gathered by the sensors of the co-located sensor platform 126 may also be communicated over the network 106 and analyzed at an external computing device or server, for example, by police, government, or another party. In some implementations, the sensor platform 126 may communicate information over the network 106 utilizing a communication module of an associated streetlight controller 104.

In some implementations, information gathered by the sensors of the sensor platform 126 may be used to communicate information to users in close proximity to the streetlight 102. The sensor platform 126 can be configured to communicate with a mobile device 128 that is in close proximity to the sensor platform 126. For example, the sensor platform 126 may request and then receive location data from mobile device 128. The sensor platform 126 may then push relevant data to the mobile device, such as location-based news or alerts, including, for example, nearby events, safety alerts, or coupons for nearby businesses. For example, a sensor platform 126 deployed on a streetlight 102 close to a shopping center may receive a signal (e.g., a signal indicative of location data) from a mobile device 128 indicating that the mobile device 128 is in close proximity to the streetlight 102. Upon receiving the signal from the mobile device 128, the sensor platform 126 may send coupons, operating hours, or special event information related to the shopping center to the mobile device 128. In an additional example, a sensor platform 126 deployed on a streetlight 102 in a parking lot may receive location data from a mobile device 128 indicating that the mobile device 128 is in close proximity to the streetlight 102. Upon receiving this location data from the mobile device 128, the sensor platform 126 may send parking information, such as hourly rates or parking reminders, such as the specific section parked in to the mobile device 128.

In some implementations, the sensor platform 126 can be configured to communicate with a motor vehicle. In some implementations, the sensor platform can be configured to communicate with a mobile device 128 connected to a motor vehicle. The data pushed to the motor vehicle may include traffic information, roadwork information, safety information, news, coupons, or advertisements. This data could be pushed to a display or speakers in the motor vehicle.

The sensor platform 126 can be configured to communicate with other streetlight controllers and/or sensor platforms, as well as gateways 108, or external sensors located on, or in the vicinity of the streetlight 102. For example, a sensor platform 126 may communicate with other streetlight controllers 104, sensor platforms 126, or external sensors through a wired or wireless connection. The sensor platform 126 can include a transceiver to wirelessly communicate with other streetlight controllers 104, sensor platforms 126, external sensors, or gateways 108. The transceiver can use a radio frequency (RF) portion of the spectrum for the communications. The sensor platforms 126 within the network 106 can be connected to one another by a wired or wireless network. For example, the sensor platforms 126 can be connected to one another by a mesh network. A sensor platform 126 can act as a node of the mesh network, and/or serve as a relay for other nodes to propagate data using the mesh network. The mesh network can be self-forming and/or self-healing. Information from the sensors included in the sensor platform 126 and information from external sensors may be transmitted to a provided communications network 110. The communications network 110 may then communicate this sensor data to a central management system. This central management system may further process the sensor data. In some implementations, the central management system may make decisions regarding changing an operating mode of one or more streetlights 102 in network 106, informing an authority of the existence of a particular event or condition at or in the vicinity of a streetlight 102. This event or condition may be, for example, an environmental or threat condition, a gunshot, a traffic event, a movement, or a weather condition.

Figure 3A:
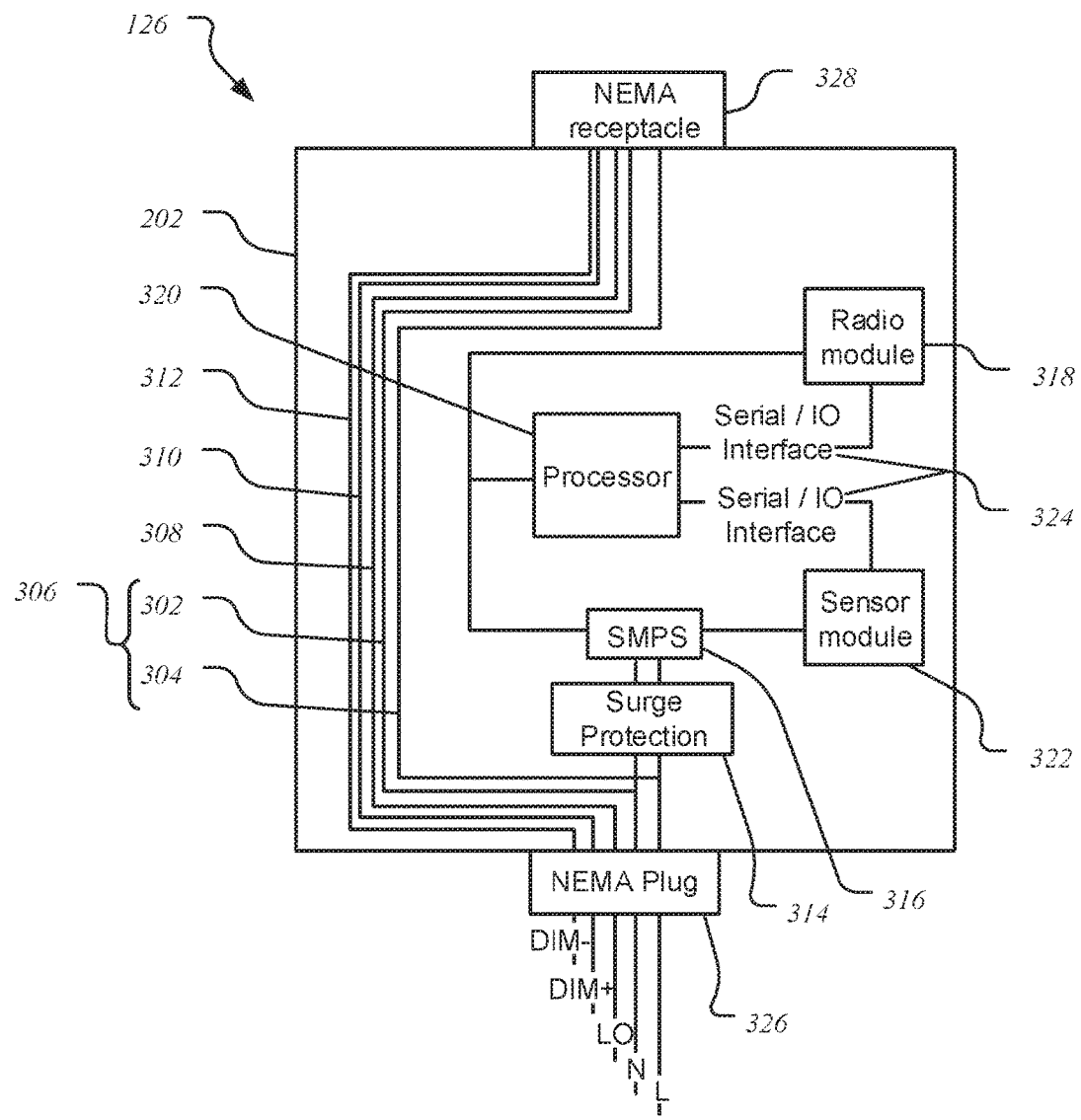
FIG. 3A is a circuit diagram showing the interfaces and internal components of an example of a sensor platform.

FIG. 3A shows a block diagram of an example implementation of the sensor platform. As shown in FIG. 3A, the sensor platform 126 can include a pass through connector 306 for powering included sensors and for passing power to an associated photocell or streetlight controller 104. Power from a streetlight 102 is delivered to the sensor platform's NEMA ANSI C136.41 Dimming Receptacle plug 326 which electrically connects to an electrical receptacle on the streetlight 102. A NEMA plug 326 is an example of an electrical connector 206. In some implementations, another connector may replace the NEMA ANSI C136.41 Dimming Receptacle plug 326. This power may be AC or DC power. Power then is passed through the sensor platform 126 via lines 302 and 304, which make up pass through connector 306 to the sensor platform's NEMA receptacle 328. In some implementations, the pass through connector 306 can be connected to one or more additional receptacles (e.g., power outlets) located on the sensor platform. Examples of such additional receptacles include an AC outlet, a universal serial bus (USB) port, or a Power over Ethernet (PoE) port. In some implementations, such a receptacle can be connected directly to the pass through connector 306 to provide AC power to a device connected via the receptacle. In some implementations, such a receptacle may be connected to the pass through connector 306 via an AC to DC converter (e.g., a switched-mode power supply) to provide DC power (e.g., 5V, 12V, or 3.3V DC) to a device connected via the receptacle. External sensors or other external devices may be connected to and powered through such one or more additional receptacles. For example, a charging port for an UAV may be powered through the pass through connector 306.

A NEMA receptacle 328 is an example of an electrical receptacle 204. In some implementations, another connector may replace the NEMA plug 326. In some implementations, the lines 302 and 304 split to provide power to one or more processors 320, radio module 318, and sensor module 322, in addition to delivering power to the sensor platform's NEMA receptacle 328. A switched-mode power supply 316 efficiently transfers power to the processor 320, radio module 318, and sensor module 322. A surge protection module 314 protects the processor 320, radio module 318, and sensor module 322. A photocell or streetlight controller 104 or shorting cap can be plugged into the sensor platform's NEMA receptacle 328 to utilize the power passed from the streetlight to the NEMA receptacle 328 to control the operation of the streetlight. A sensor platform 126 may also include two lines capable of sending information for dimming the streetlight from a streetlight controller 104 connected to the sensor platform's NEMA receptacle 328, DIM+ 310 to brighten the streetlight and DIM− 312 to dim the streetlight.

Figure 3B:
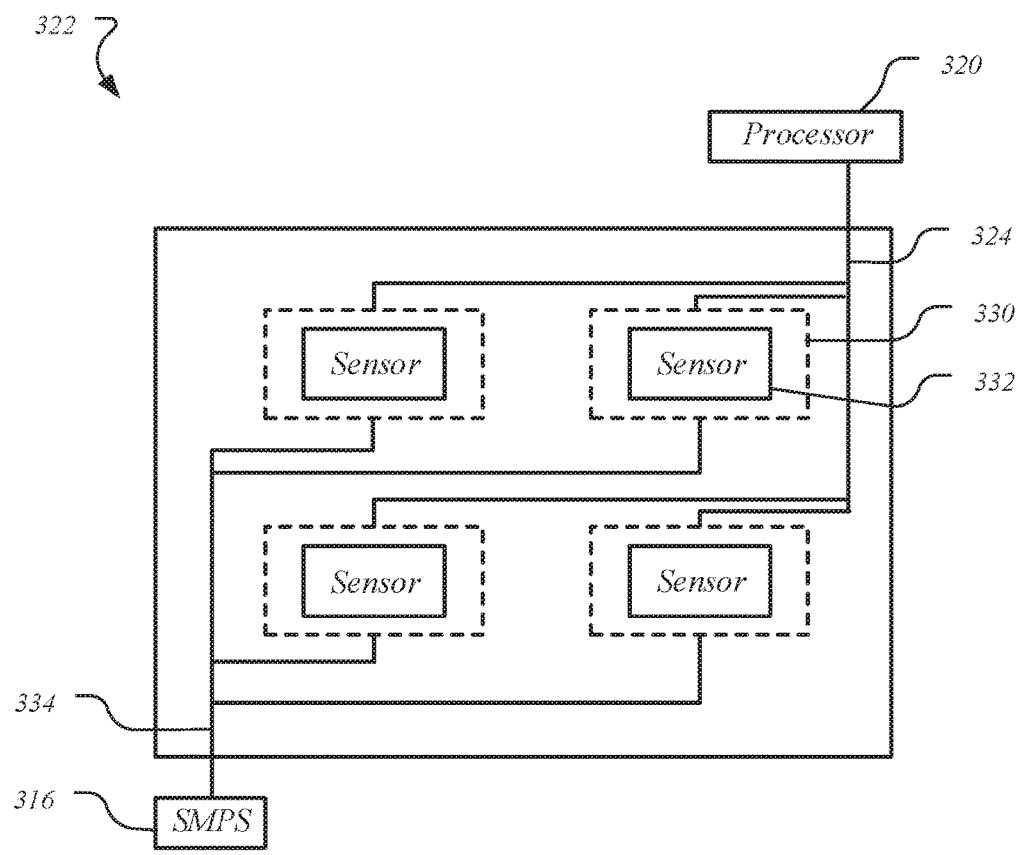
FIG. 3B is a block diagram showing the interfaces and internal components of an example of a sensor module of a sensor platform.

Referring to FIG. 3B, in some implementations, the sensor platform 126 can be made configurable, allowing different combinations of individual sensors to be included in the sensor module 322 of the sensor platform 126. In some implementations, the sensor module 322 may include a plurality of slots 330 to which individual sensors 332 may be connected. The slots 330 can be connected to other modules of the sensor platform 126 such that sensors received within a slot can readily use the other modules. For example, each slot 330 can be connected to the switched mode power supply (SMPS) 316 through electrical connection 334, making power available to a sensor 332 connected to the slot 330. In another example, each slot 330 can be connected to a processor 320 through a connection between an input/output port of the slot and the input/output lines 324. The connections between input/output ports of the slots and the input/output lines 324 may be used, for example, to communicate data between the two or more sensors 332 and/or between the sensors 332 and the processor 320. In some implementations, the input/output lines 324 may also provide a connection between the slots 330 and a radio module 318 of the sensor platform. The one or more processors 320 of the sensor platform 126 may send data to, and/or receive data from one or more of the radio module 318 and the sensor module 322 through the input/output lines 324.

In some implementations, the slots 330 allow the sensor platform 126 to be configured with a customized set of sensors. For example, the sensor platform 126 can be made available to developers, allowing them to configure the sensor module 322 to include appropriate combinations of sensors as needed. As described above, the sensors that can be included on the sensor module include, for example, various combinations of one or more environmental sensors, carbon monoxide sensors, carbon dioxide sensors, noise sensors, seismic sensors, threat sensors, radioactivity sensors, biochemical sensors, contact sensors, motion sensors, parking sensors, traffic counters, or pedestrian counters. In some implementations, the sensor module 322 can be made configurable by including a circuit board having multiple slots for receiving individual sensors. The individual sensors may be connected, for example, to input/output lines 324 by input/output ports. Input/output lines 324 may be used for sending and receiving information between the processor and the sensors.

In some implementations, the radio module 318 can include circuitry (e.g., one or more transceivers) configured to wirelessly communicate using one or more communication technologies. The communication technologies can include, for example, Wi-Fi, Bluetooth®, ZigBee, iBeacons, near-field communications (NFC), cellular, or other proprietary or non-proprietary technologies. The radio module 318 may allow the sensor platform 126 to communicate with an associated streetlight controller 104, with other sensor platforms 126 located on other streetlights in the streetlight network 106 (shown in FIG. 1), or to a gateway 108 on a network 110 (shown in FIG. 1). The radio module 318 also may allow the sensor platform 126 to communicate with a mobile device 128 in close proximity to the streetlight 102 upon which the sensor platform 126 is deployed.

The radio module 318 may also allow the sensor platform 126 to wirelessly communicate with, and/or control, external sensors or devices located on or near the streetlight. In some implementations, the sensor platform 126 may also communicate with external sensors or devices located on the streetlight via a wired connection. Communication with these external sensors or devices may allow the sensor platform 126 or an associated streetlight controller 104, for example, to control operations of the external sensors or devices, or to control the streetlight 102 to operate in a particular mode. In one example, where a sensor platform 126 includes a traffic sensor, the sensor platform 126 may generate a control signal to operate a camera disposed on the streetlight responsive to determining a traffic condition such as a traffic back-up. The control signal can be configured to, for example, direct the camera to capture the event and provide a video/image feed to a traffic information server. In another example, where the sensor platform 126 includes a gunshot sensor, the sensor platform 126 can transmit, upon receiving information indicative of detection of a gunshot, an alert signal that is transmitted to law enforcement authorities. The sensor platform 126 may also generate a control signal for a camera disposed on the streetlight to record in the direction from which the gunshot originated. In another example, the sensor platform 126 may include a weather sensor. Upon receiving an indication from the weather sensor that snowfall is occurring, the sensor platform 126 may direct an external sensor to measure the snow accumulation or may direct a camera to take a photo of the snow accumulation in a particular area where a measuring stick is located.

In some implementations, information from one or more external sensors may also be routed through the sensor platform 126. For example, information received from the one or more external sensors may be communicated by the sensor platform 126 to an associated streetlight controller 104, for example, to direct the streetlight 102 to operate in a particular mode. The sensor platform 126 could also communicate with other sensor platforms 126 or streetlight controllers 104 in the network 106 to direct all streetlights in a group to operate in a particular mode. For example, an external weather sensor may indicate to a sensor platform 126 that it is snowing or raining. With this information from the external weather sensor, the sensor platform 126 may communicate the weather status to other sensor platforms 126 or streetlight controllers 104 connected over the network 106 to turn all streetlights 102 (or streetlights within a predetermined vicinity of the weather sensor) to full power. In another example, based on information indicative of motion detected by an external motion sensor, the sensor platform 126 may communicate with other sensor platforms 126 or streetlight controllers 104 connected over the network 106 to turn streetlights 102 in a particular area (e.g. in a parking lot or along a particular block of a street) to full power. In some implementations, the sensor platform 126 can be connected to an external sensor configured to detect a breach of security at the streetlight itself. For example, a streetlight box enclosing connections at the base of the streetlight can be equipped with a sensor (e.g., a magnetic or electric sensor) configured to detect a breach of the streetlight box. Upon receiving indication of a breach (e.g., an attempted wire theft) from such an external sensor, the sensor platform can be configured to perform one or more remedial/preventive actions such as sending an alert to appropriate authorities, triggering a camera to capture images/video of the vicinity of the streetlight, and/or sound an alarm to deter the perpetrators of the breach.

In some implementations, the sensor platform may communicate with sensors in the vicinity of the streetlight pole, but not directly on the pole. In some implementations, the sensor platform may communicate with a sensor on a nearby trash can. A sensor on a trash can could indicate that the can is full, or a certain percentage full. This level sensor could inform when the trash can should be emptied, for example by alerting a municipal worker.

Figure 4:
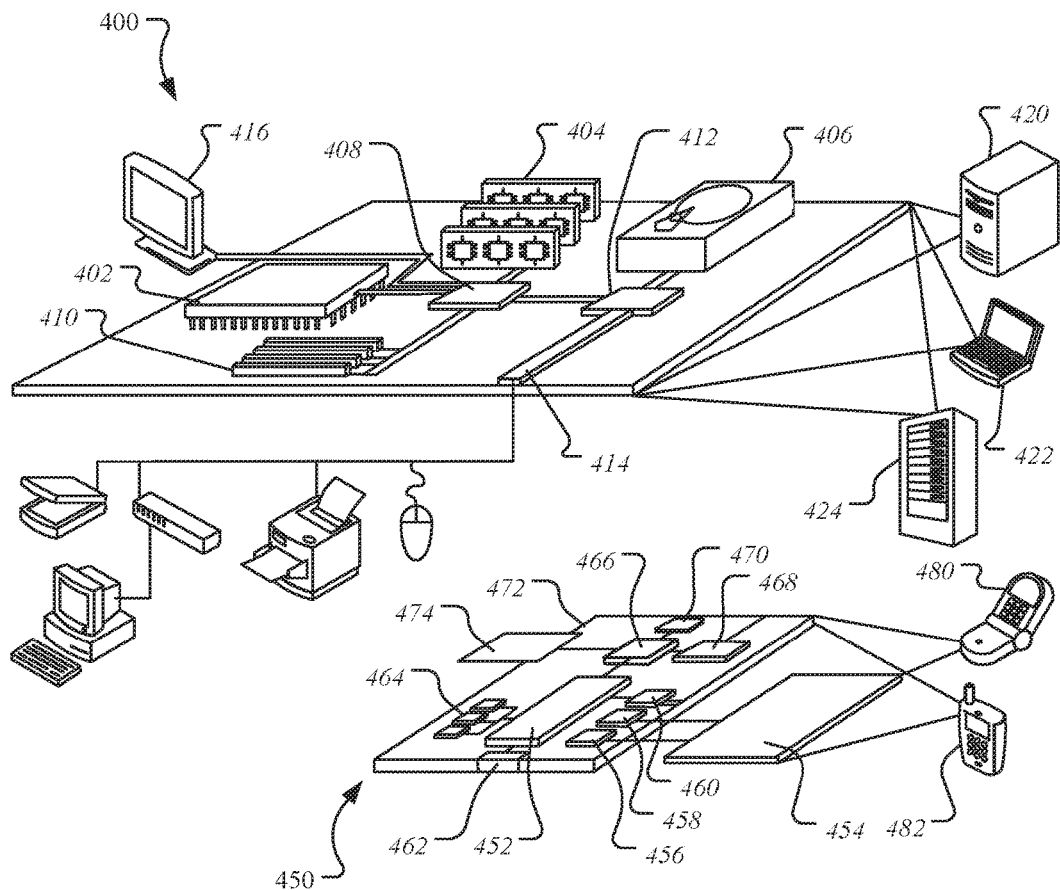
FIG. 4 is a block diagram showing an example of a computing device.

FIG. 4 shows an example of a computing device 400 and a mobile device 450, which may be used with the techniques described here. For example, referring to FIG. 1, the gateway device 108, streetlight controller 104, or devices 116, 120 or 122 could be examples of the computing device 400 or the mobile device 450. In some implementations, at least portions of the computing device 400 or the mobile device 450 can be used for implementing the radio module 318 and/or the sensor module 322. Computing device 400 is intended to represent various forms of digital computers, such as laptops, desktops, workstations, personal digital assistants, servers, tablet computers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 44, a communication interface 466, and a transceiver 468, among other components. The device 450 may also be provided with a storage device, such as a microdrive or other device, to provide additional storage. Each of the components 450, 452, 464, 44, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 44. The display 44 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 44 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) or touchscreen by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are also within the scope of the following claims.

What is claimed is:
1. A configurable sensor platform comprising:
an enclosure configured to be deployed between a streetlight and a streetlight controller that manages operations of the streetlight;
a sensor module comprising a plurality of sensor receptacles configured to receive at least a portion of various combinations of sensors;
a plurality of sensors disposed in the enclosure, wherein individual sensors included in the plurality of sensors are selectable in accordance with a target functionality of the configurable sensor platform, the plurality of sensors being one of the various combinations of sensors;

one or more processing devices disposed in the enclosure, the one or more processing devices configured to receive data from at least one of the plurality of sensors;

an electrical receptacle for receiving the streetlight controller in a substantially secure configuration;

an electrical connector for connecting the enclosure to the streetlight; and at least one pass-through connector disposed within the enclosure to provide an electrical connection between the electrical connector and the electrical receptacle.

2. The configurable sensor platform of claim 1 wherein the plurality of sensors comprises at least one of an environmental sensor, a noise sensor, a seismic sensor, a threat sensor, a contact sensor, or a motion sensor.

3. The configurable sensor platform of claim 1 wherein the plurality of sensors comprise at least one of a parking sensor, a pedestrian counter, or a traffic counter.

4. The configurable sensor platform of claim 1 wherein at least a subset of the plurality of sensors is a part of a wireless sensor network.

5. The configurable sensor platform of claim 4, wherein the wireless sensor network includes one or more external sensors disposed outside the enclosure of the sensor platform.

6. The configurable sensor platform of claim 1, wherein the sensor module comprises a circuit board and wherein the sensor receptacles comprise a plurality of slots on the circuit board the plurality of slots configured to receive at least a subset of the plurality of sensors.

7. The configurable sensor platform of claim 6 wherein at least some slots in the plurality of slots are electrically connected to the pass-through connector.

8. The configurable sensor platform of claim 7 wherein one or more of the slots are connected to the pass-through connector through an alternating current (AC) to direct current (DC) converter.

9. The configurable sensor platform of claim 6 wherein at least some slots in the plurality of slots are electrically connected to an input/output line of one or more processing devices.

10. The configurable sensor platform of claim 6 wherein one or more of the slots comprise an input/output port electrically connected to an input/output line of one or more processors.

11. The configurable sensor platform of claim 1 wherein the electrical receptacle complies with a standard associated with streetlight fixtures.

12. The configurable sensor platform of claim 11 wherein the standard is set by National Electrical Manufacturers Association (NEMA).

13. The configurable sensor platform of claim 1 wherein power for the plurality of sensors is provided through the pass-through connector.

14. The configurable sensor platform of claim 1 further comprising an outlet configured to provide power to an external sensor or device, wherein the outlet is connected to the at least one pass through connector.

15. The configurable sensor platform of claim 14, wherein the outlet comprises a charging port for an unmanned aerial vehicle.

16. The configurable sensor platform of claim 1 further comprising a plurality of input/output interfaces disposed in the enclosure, the input/output interfaces being configured to connect external sensors located outside of the enclosure to the configurable sensor platform.

17. The configurable sensor platform of claim 1 further comprising one or more communications devices disposed in the enclosure.

18. An apparatus comprising:
a streetlight controller that manages operations of a streetlight; and
a configurable sensor platform comprising:
an enclosure configured to be deployed between the streetlight and the streetlight controller that manages operations of the streetlight,
a sensor module comprising a plurality of sensor receptacles configured to receive various combinations of sensors,
a plurality of sensors disposed in the enclosure, wherein individual sensors included in the plurality of sensors are selectable in accordance with a target functionality of the configurable sensor platform, the plurality of sensors being one of the various combinations of sensors,
one or more processing devices disposed in the enclosure, the one or more processing devices configured to receive data from at least one of the plurality of sensors,
an electrical receptacle for receiving the streetlight controller in a substantially secure configuration,
an electrical plug for connecting the enclosure to the streetlight, and
one or more pass-through connectors disposed within the enclosure to provide an electrical connection between the electrical plug and the electrical receptacle.

19. The apparatus of claim 18 wherein the plurality of sensors comprises at least one of an environmental sensor, a noise sensor, a seismic sensor, a threat sensor, a contact sensor, or a motion sensor.

20. The apparatus of claim 18 wherein the plurality of sensors comprise at least one of a parking sensor, a pedestrian counter, or a traffic counter.

21. The apparatus of claim 18 wherein at least a subset of the plurality of sensors is a part of a wireless sensor network.

22. The apparatus of claim 21, wherein the wireless sensor network includes one or more external sensors disposed outside the enclosure of the sensor platform.

23. The apparatus of claim 18, wherein the sensor module comprises a circuit board and wherein the sensor receptacles comprise a plurality of slots on the circuit board the plurality of slots configured to receive at least a subset of the plurality of sensors.

24. The apparatus of claim 23 wherein at least some slots in the plurality of slots are electrically connected to the one or more pass-through connectors.

25. The apparatus of claim 24 wherein one or more of the slots are connected to the one or more pass-through connectors through an alternating current (AC) to direct current (DC) converter.

26. The apparatus of claim 23 wherein at least some slots in the plurality of slots are electrically connected to an input/output lines of one or more processors to sample, process, store, and communicate data being sensed by the plurality of sensors.

27. The apparatus of claim 23 wherein one or more of the slots comprise an input/output port electrically connected to an input/output line of one or more processors.

28. The apparatus of claim 18 wherein power for the plurality of sensors is provided through the one or more pass-through connectors.

29. The apparatus of claim 18 further comprising an outlet configured to provide power to an external sensor or device, wherein the outlet is connected to the one or more pass through connectors.

30. The apparatus of claim 29, wherein the outlet comprises a charging port for an unmanned aerial vehicle.

* * * * *